US010305339B2

(12) United States Patent
Awazu et al.

(10) Patent No.: US 10,305,339 B2
(45) Date of Patent: May 28, 2019

(54) ROTATING ELECTRICAL MACHINE AND METHOD OF MANUFACTURING THE SAME

(71) Applicants: Kabushiki Kaisha Toshiba, Minato-ku (JP); Toshiba Industrial Products and Systems Corp., Mie-gun (JP)

(72) Inventors: Minoru Awazu, Yokohama (JP); Kyouichi Okada, Yokohama (JP); Isamu Nitta, Yokohama (JP); Hisaaki Shimozu, Mie-gun (JP)

(73) Assignees: KABUSHIKI KAISHA TOSHIBA, Minato-ku (JP); TOSHIBA INDUSTRIAL PRODUCTS AND SYSTEMS CORPORATION, Mie-Gun (JP)

( * ) Notice: Subject to any disclaimer, the term of this patent is extended or adjusted under 35 U.S.C. 154(b) by 160 days.

(21) Appl. No.: 14/210,819

(22) Filed: Mar. 14, 2014

(65) Prior Publication Data

US 2015/0042196 A1 Feb. 12, 2015

(30) Foreign Application Priority Data

Aug. 7, 2013 (JP) .................. 2013-164178

(51) Int. Cl.
*H02K 3/12* (2006.01)
*H02K 3/48* (2006.01)
*H02K 3/28* (2006.01)

(52) U.S. Cl.
CPC .............. *H02K 3/12* (2013.01); *H02K 3/48* (2013.01); *H02K 3/28* (2013.01); *Y10T 29/49009* (2015.01)

(58) Field of Classification Search
CPC .. H02K 3/12; H02K 3/48; H02K 3/28; H02K 3/00; H02K 3/04; Y10T 29/49009
(Continued)

(56) References Cited

U.S. PATENT DOCUMENTS 3,324,322 A * 6/1967 Johns ................ H02K 3/28
310/198
5,231,324 A * 7/1993 Kawamura ........... H02K 3/28
310/184
(Continued)

FOREIGN PATENT DOCUMENTS

CN 101595623 A 12/2009
JP 50-8003 A 1/1975
(Continued)

OTHER PUBLICATIONS

Notification of Opinion on Examination and Search Report dated Jun. 15, 2015 in Taiwanese Patent Application No. 103107962 (with Partial English language translation and English translation of Category of Cited Documents).
(Continued)

*Primary Examiner* — Bernard Rojas
*Assistant Examiner* — Maged M Almawri
(74) *Attorney, Agent, or Firm* — Oblon, McClelland, Maier & Neustadt, L.L.P.

(57) ABSTRACT

A rotating electrical machine includes a stator having a stator core, coil groups, and a rotor. The coil groups include a first coil group located at an outer circumference side of the stator core and a second coil group located at an inner circumference side of the stator core. The first and second coil groups are formed into an annular shape by inserting unit coils into stator core slots so that the coils adjacent in a circumferential direction overlap alternately in a radial direction and so that an inside and an outside of the overlap alternate with each other. The first coil group is disposed to surround an outside of the second coil group. The first and second coil groups are disposed in a concentric manner. The unit coils constituting the second coil group have shorter (Continued)

circumferential lengths than the unit coils constituting the first coil group.

11 Claims, 10 Drawing Sheets

(58) Field of Classification Search
USPC .......... 310/198, 203, 208, 206, 207; 29/596, 29/732
See application file for complete search history.

(56) References Cited

U.S. PATENT DOCUMENTS

| | | | | |
|---|---|---|---|---|
| 5,898,251 | A * | 4/1999 | Mochizuki | H02K 3/28 29/596 |
| 6,462,453 | B1 * | 10/2002 | Asao | H02K 3/12 310/179 |
| 6,727,625 | B2 * | 4/2004 | Ooiwa | H02K 3/28 310/184 |
| 6,956,314 | B2 * | 10/2005 | Higashino | H02K 3/12 310/189 |
| 8,581,460 | B2 * | 11/2013 | Shinohara | H02K 3/12 310/207 |
| 8,836,195 | B2 * | 9/2014 | Yokochi | H02K 3/28 310/179 |
| 9,118,231 | B2 * | 8/2015 | Matsubara | H02K 3/28 |
| 2002/0017825 | A1 * | 2/2002 | Oohashi | H02K 3/12 310/207 |
| 2002/0047449 | A1 * | 4/2002 | Kim | H02K 3/12 310/184 |
| 2006/0152188 | A1 * | 7/2006 | Yasuhara | H02K 3/28 318/727 |
| 2008/0174196 | A1 * | 7/2008 | Hattori | H02K 3/28 310/180 |
| 2009/0261681 | A1 * | 10/2009 | Taguchi | H02K 23/30 310/198 |
| 2010/0141078 | A1 * | 6/2010 | Kouda | H02K 3/12 310/195 |
| 2010/0283349 | A1 * | 11/2010 | Wolf | H02K 3/28 310/195 |
| 2011/0198953 | A1 * | 8/2011 | Shinohara | H02K 3/12 310/71 |
| 2013/0127290 | A1 * | 5/2013 | Matsubara | H02K 3/38 310/208 |
| 2014/0252909 | A1 * | 9/2014 | Sakata | H02K 3/28 310/208 |
| 2015/0022045 | A1 * | 1/2015 | Hagiwara | H02K 3/38 310/201 |
| 2015/0061450 | A1 * | 3/2015 | Nakagawa | H02K 3/12 310/198 |

FOREIGN PATENT DOCUMENTS

| | | | | |
|---|---|---|---|---|
| JP | 10-28346 | | 1/1998 | |
| JP | 2010-246343 | A | 10/2010 | |
| JP | 2011-125135 | A | 6/2011 | |
| JP | 2011-151914 | A | 8/2011 | |
| JP | WO 2013058268 | A1 * | 4/2013 | ............... H02K 3/28 |
| JP | WO 2013114729 | A1 * | 8/2013 | ............... H02K 3/38 |
| JP | 5329196 | B2 | 10/2013 | |
| WO | WO 2013/089107 | A1 | 6/2013 | |

OTHER PUBLICATIONS

Combined Office Action and Search Report dated Apr. 25, 2016 in Chinese Patent Application No. 201410083295.3 with partial English translation and English translation of category of cited documents.

Office Action dated Mar. 21, 2017 in Japanese Patent Application No. 2013-164178.

Office Action issued in corresponding Japanese Application No. 2013-164178 dated Oct. 3, 2017.

Office Action dated Feb. 28, 2018 in Vietnamese Patent Application No. 1-2014-00780 with English translation.

* cited by examiner

ROTATING ELECTRICAL MACHINE AND METHOD OF MANUFACTURING THE SAME

CROSS-REFERENCE TO RELATED APPLICATIONS

This application is based upon and claims the benefit of priority from the prior Japanese Patent Application No. 2013-164178 filed on Aug. 7, 2013, the entire contents of both of which are incorporated herein by reference.

FIELD

Embodiments described herein relate to a rotating electrical machine and a method of manufacturing the rotating electrical machine.

BACKGROUND

Lap winding is well known as one of methods of winding a stator winding of a rotating electrical machine. In the lap winding, coils adjacent to one another in a circumferential direction of a stator core are wound so that the coils overlap one after another in a radial direction of the stator core and so that an inside and an outside of overlap alternate. In the lap winding method, coils per pole per phase are caused to radially overlap alternately while slots into which the coils are to be inserted are shifted by predetermined pitch. Since a coil is normally made by winding a copper wire at a large number of times, the coil lacks flexibility and has low operability in inserting it into a slot. In view of this drawback, a method has been proposed in which coils per pole per phase are divided into, for example, two groups when to be inserted into slots.

However, when coils divided into two groups are inserted into the slots radially double, this results in differences in the heights of coil ends since crossovers between slots differ between the outer peripheral side and the inner peripheral side. Since parts located at the coil ends do not contribute to the performance of the rotating electrical machine, it is advantageous to reduce the parts located at the coil ends as much as possible.

DETAILED DESCRIPTION

In general, according to one embodiment, a rotating electrical machine includes a stator having a stator core and a plurality of groups of coils. The plurality of coil groups includes a first coil group located at an outer circumference side of the stator core and a second coil group located at an inner circumference side of the stator core. The first and second coil groups are formed into an annular shape by inserting a plurality of unit coils into slots of the stator core so that the coils adjacent in a circumferential direction of the stator core overlap alternately in a radial direction of the stator core and so that an inside and an outside of the overlap alternate with each other. The rotating electrical machine further includes a rotor rotatably mounted on the stator. In the machine, the first coil group is disposed to surround an outside of the second coil group. The first and second coil groups are disposed in a concentric manner. The unit coils constituting the second coil group have shorter circumferential lengths than the unit coils constituting the first coil group.

Several embodiments directed to a rotating electrical machine and a method of manufacturing the machine will be described with reference to the accompanying drawings. Identical or similar parts are labeled by the same reference symbols throughout the embodiments and reiterated description of these identical parts will be eliminated. Furthermore, a coil is formed by winding a copper wire by a predetermined number of times into an annular shape throughout the embodiments. A stator winding is configured by connecting a plurality of coils throughout the embodiments.

Figure 1:
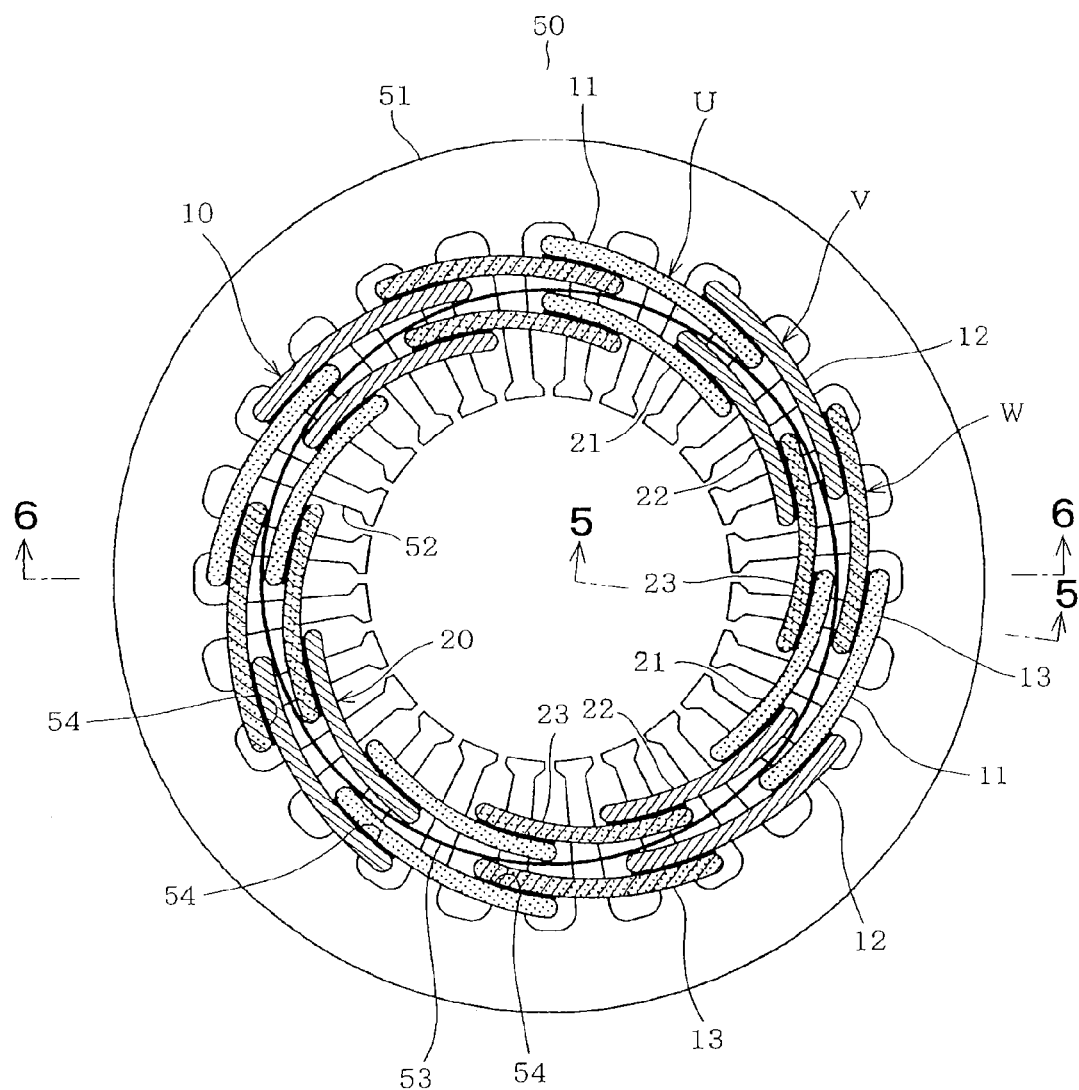
FIG. 1 is a plan view of the stator of a rotating electrical machine in accordance with a first embodiment.

A first embodiment will be described with reference to FIGS. 1 to 7. A rotating electrical machine of the inner rotor type provided with a laminated stator 50 will be described in the first embodiment. Referring to FIG. 1, the stator 50 of the three-phase AC rotating electrical machine is shown. The stator 50 constitutes a rotating electrical machine of the inner rotor type together with a general rotor. In this case, the rotating electrical machine may be a permanent magnet motor or an induction electric motor. The rotating electrical machine should not be limited to the inner rotor type but may be of the outer rotor type.

The stator 50 of the three-phase AC rotating electrical machine as shown in FIG. 1 includes a stator core 51 and three-phase stator windings, that is, U-phase stator winding U, V-phase stator winding V and W-phase stator winding W. The stator core 51 is formed by punching out an electromagnetic steel plate into a predetermined shape and stacking a plurality of punched-out electromagnetic steel plates. The stator core 51 is formed with, for example, twenty-four slots 52. The stator windings U, V and W are contained in slots 52. The stator 50 is thus formed into a four-pole twenty-four-slot stator.

The U-phase stator winding U has four U-phase first stage unit coils 11 and four U-phase second stage unit coils 21. U-phase poles are constituted by combining one of the U-phase first stage unit coils 11 and one of the U-phase second stage unit coils 21. In this case, the U-phase first and second stage unit coils 11 and 21 have the same slot pitch, for example, three slot pitches. The U-phase first stage unit coils 11 and the U-phase second stage unit coils 21 are radially overlapped in the same slots 52 with respect to the stator core 51. In this case, the U-phase second stage unit coils 21 are provided radially inside the stator core 51 with respect to the U-phase first stage unit coils 11.

The V-phase stator winding V has four V-phase first stage unit coils 12 and four V-phase second stage unit coils 22. V-phase poles are constituted by combining one of the V-phase first stage unit coils 12 and one of the V-phase second stage unit coils 22. In this case, the V-phase first and second stage unit coils 12 and 22 have the same slot pitch, for example, three slot pitches. The V-phase first stage unit coils 12 and the V-phase second stage unit coils 22 are radially overlapped in the same slots 52 with respect to the stator core 51. In this case, the V-phase second stage unit coils 22 are provided radially inside the stator core 51 with respect to the V-phase first stage unit coils 12.

The W-phase stator winding W has four W-phase first state unit coils 13 and four W-phase second stage unit coils 23. W-phase poles are constituted by combining one of the W-phase first stage unit coils 13 and one of the W-phase second stage unit coils 23. In this case, the W-phase first and second stage unit coils 13 and 23 have the same slot pitch, for example, three slot pitches. The W-phase first stage unit coils 13 and the W-phase second stage unit coils 23 are radially overlapped in the same slots 52 with respect to the stator core 51. In this case, the W-phase second stage unit coils 23 are provided radially inside the stator core 51 with respect to the W-phase first stage unit coils 13. In this case, furthermore, the first stage unit coils 11, 12 and 13 of each pole differ in the circumferential length from the second stage unit coils 21, 22 and 23 of each pole but are similar in the position relationship, slot pitch and the like to the second stage unit coils 21, 22 and 23 of each pole.

Figure 2A:
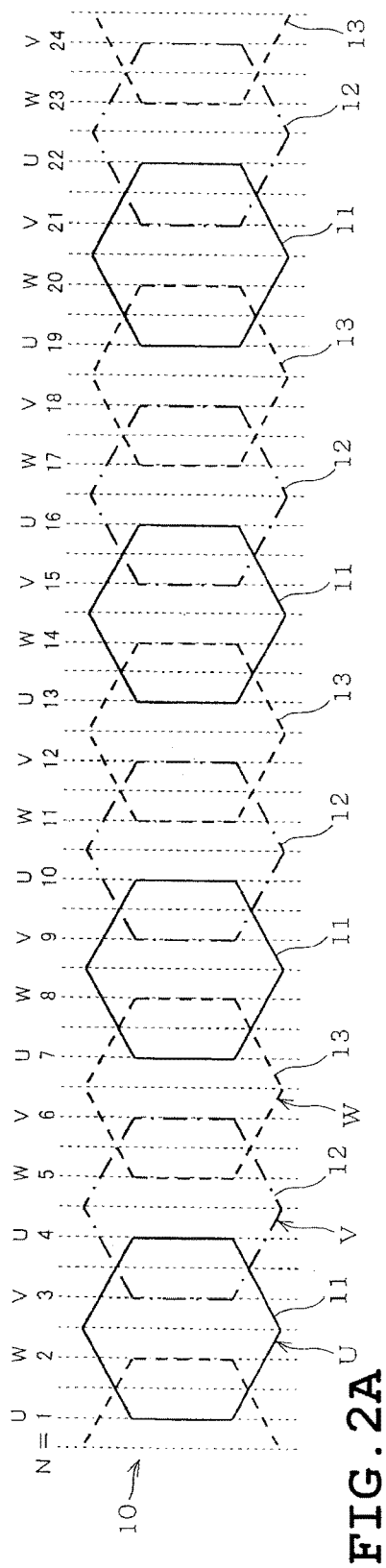
FIGS. 2A and 2B illustrate a configuration of U-phase, V-phase and W-phase stator windings, showing an arrangement of first stage coil groups and a configuration of U-phase, V-phase and W-phase stator windings, showing an arrangement of second stage coil groups, respectively.
Figure 2B:
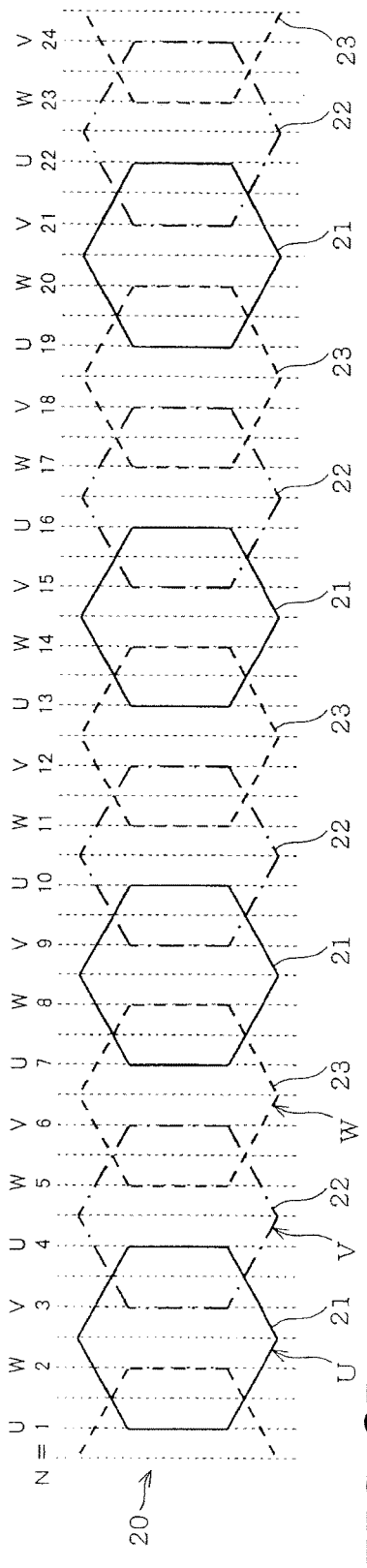

In FIGS. 2A and 2B, reference symbol N designates integers 1 to 24 regarding the twenty-four slots 52. An N-th slot refers to one of the slots 52. The first stage unit coils 11, 12 and 13 of each phase and the second stage unit coils 21, 22 and 23 of each phase have a constant coil pitch, in this case, three slots.

As shown in FIGS. 2A and 2B, the U-phase first stage unit coils 11 are inserted in the first, fourth, seventh and tenth slots thereby to be wound and the U-phase second unit coils are contained in the thirteenth, sixteenth, nineteenth and twenty-second slots thereby to be wound on the stator core 51, respectively. The V-phase first stage unit coils 12 and the V-phase second stage unit coils 22 are contained in the third, sixth, ninth and twelfth slots and the fifteenth, eighteenth, twenty-first and twenty-fourth slots thereby to be wound on the stator core 51, respectively. The W-phase first stage unit coils 13 and the W-phase second stage unit coils 23 are contained in the fifth, eighth, eleventh, fourteenth, seventeenth, twentieth, twenty-third ad second slots thereby to be wound on the stator core 51, respectively.

Figure 3:
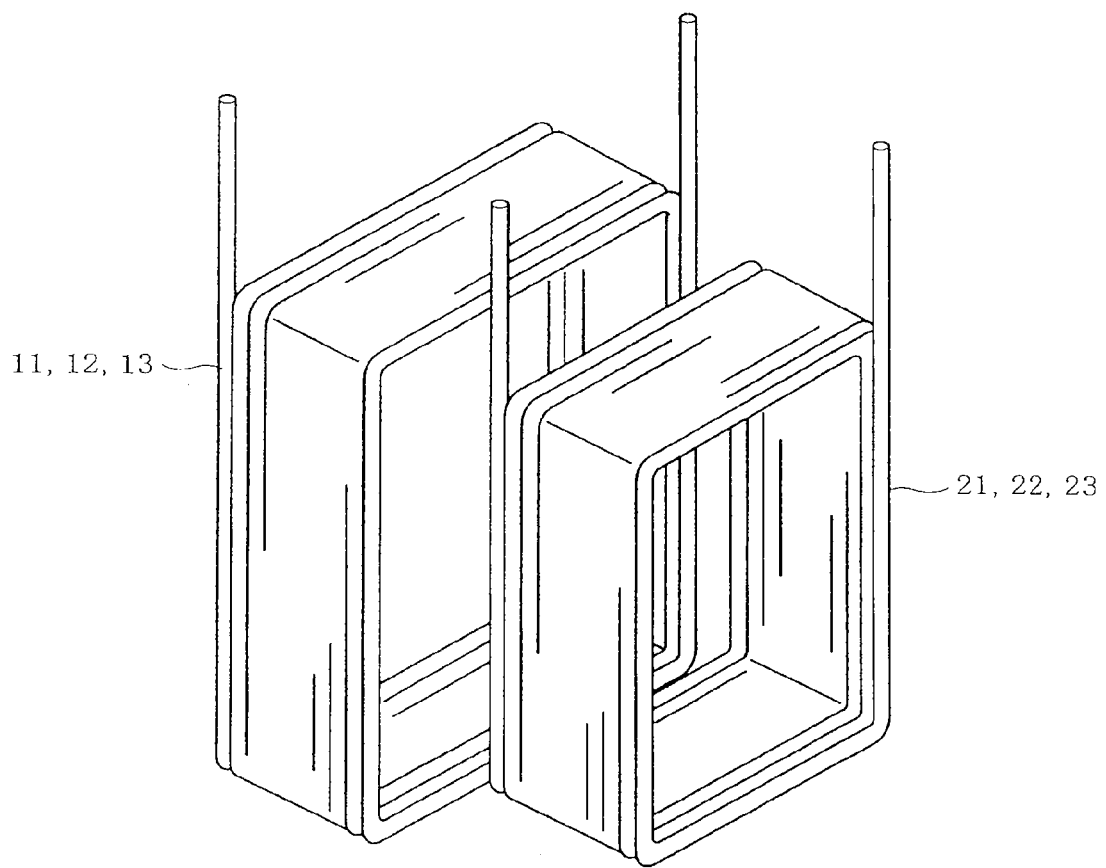
FIG. 3 is a perspective view of first and second stage unit coils.

Referring now to FIG. 3, the configuration of the first stage unit coils 11, 12 and 13 and the second stage unit coils 21, 22 and 23 will be described. As shown, the first stage unit coils 11, 12 and 13 have the same configuration and the second stage unit coils 21, 22 and 23 have the same configuration.

The first and second stage unit coils 11 to 13 and 21 to 23 have the same number of turns, for example, 20 turns. The first and second stage unit coils 11 to 13 and 21 to 23 are combined so that the number of turns becomes the same as before division, for example, 40 turns. The second stage unit coils 21 to 23 have respective shorter circumferential lengths than the first stage unit coils 11 to 13. More specifically, the second stage unit coils 21 to 23 provided radially inside, that is, at the inner circumference side of the stator core 51 have the shorter circumferential lengths than the first stage unit coils 11 to 13 provided radially outside, that is, at the outer circumference side of the stator core 51.

Figure 4:
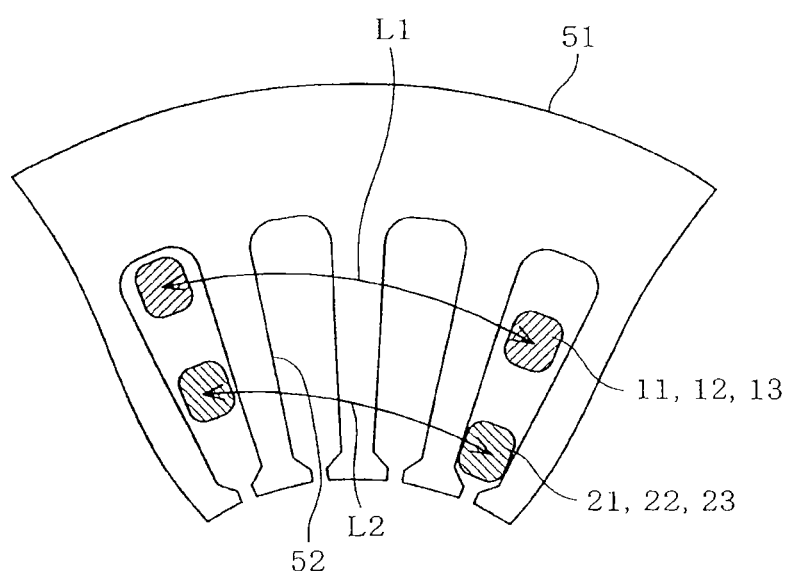
FIG. 4 is a partially broken view of the stator.

Referring now to FIG. 4, assume that reference symbol "L1" designates a distance between portions where the first stage unit coils 11 to 13 are disposed on the circumference of the stator core 51, that is, between the slots 52 in the radially outer portions of the stator core 51. Further assume that reference symbol "L2" designates a distance between portions where the second stage unit coils 21 to 23 are disposed on the circumference of the stator core 51, that is, between the slots 52 in the radially inner portions of the stator core 51. In this case, the distance L2 is shorter than the distance L1 due to the difference in the diameter of the stator core 51 in the portions where the first and second stage unit coils 11 to 13 and 21 to 23 are provided.

The first stage unit coils 11 to 13 have respective circumferential lengths which are set according to the distance L1 so as to conform with the radially outside portion of the stator core 51. As a result, heights of coil ends of the first stage unit coils 11 to 13 are reduced as much as possible. The second stage unit coils 21 to 23 located inside the first stage unit coils 11 to 13 have respective shorter circumferential lengths than the outwardly located first stage unit coils 11 to 13. The circumferential lengths of the second stage unit coils 21 to 23 are set according to the distance L2 so as to conform with the radially inside portion of the stator core 51. Accordingly, the height of the coil ends of the second stage unit coils 21 to 23 can be reduced in this case as compared with the case where the first and second stage unit coils 11 to 13 and 21 to 23 have the same circumferential lengths.

Figure 5A:
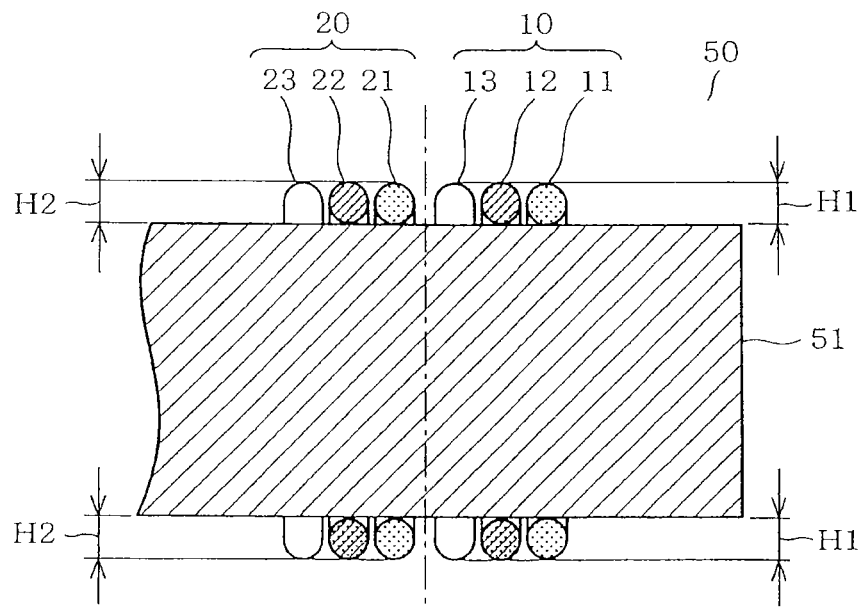
FIGS. 5A and 5B are sectional views taken along lines 5-5 in FIG. 1, showing the coil ends in the first embodiment and the in the prior art, respectively.
Figure 5B:
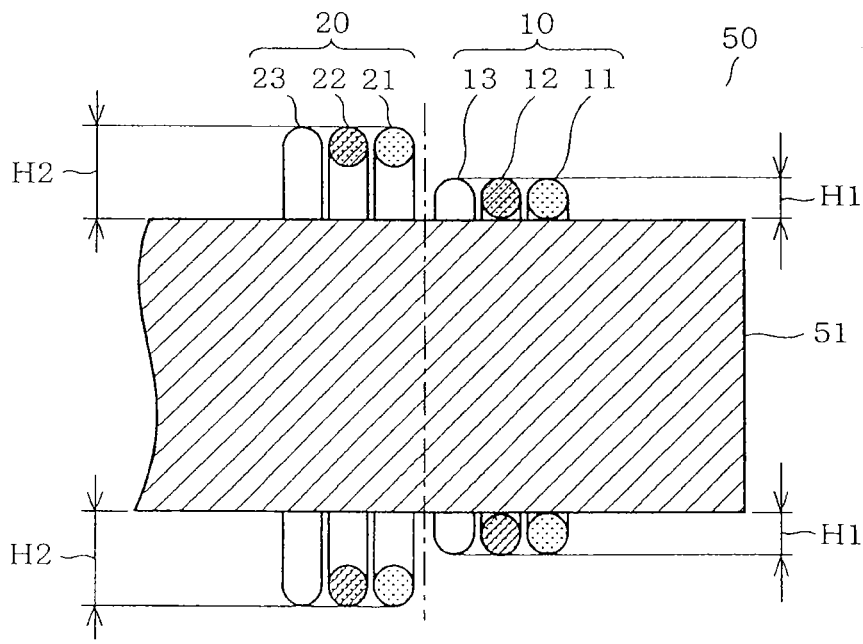

Referring to FIGS. 5A and 5B, the unit coils 11 to 13 and 21 to 23 have respective parts protruding axially outward from an end of the slot 52. The height of coil end refers to a dimension of these protruding parts as shown by reference symbols H1 and H2 in FIGS. 5A and 5B. When the first and second stage unit coils 11 to 13 and 21 to 23 have the same circumference as in the conventional configuration, the height H2 of the coil end of the second stage coil group 20 is larger than the height H1 of the coil end of the first stage coil group 10. On the other hand, when the second stage unit coils 21 to 23 have respective shorter circumferential lengths than the first stage unit coils 11 to 13 as in the embodiment, the height H2 of the coil end of the second stage coil group 20 can be rendered substantially equal to the height H1 of the coil end of the first stage coil group 10 as shown in FIG. 5A.

FIGS. 5A and 5B show the U-phase unit coils 11 and 21, the V-phase unit coils 12 and 22 and the W-phase unit coils 13 and 23 conceptually aligned for the purpose of comparison of heights of coil ends of these unit coils. Accordingly, FIGS. 5A and 5B differ from the views actually taken along line 5-5 in FIG. 1.

The first stage unit coils 11 to 13 and the second stage unit coils 21 to 23 are disposed in the slots 52 of the stator core 51 at different steps. More specifically, the first stage unit coils 11 to 13 are located in the back of the slots 52 and constitute the first stage coil group 10 formed in the lap winding manner as shown in FIG. 1. The second stage unit coils 21 to 23 are located radially inside the first stage unit coils 11 to 13, that is, at open sides of the slots 52 and constitute the second stage coil group 20 formed by the lap winding method. In other words, the second stage coil group 20 is disposed inside the first stage coil group 10 formed in the lap winding manner.

In the embodiment, the lap winding manner refers to a manner of winding the circumferentially adjacent coils of the stator core 51 so that the coils overlap radially alternately and so that each coil has one side located radially outside one adjacent coil and the other side located radially inside another adjacent coil. In this case, the first and second stage coil groups 10 and 20 are configured into an annular shape as a whole and disposed concentrically with each other as a whole. The first stage coil group 10 is disposed so as to surround the second stage coil group 20. The concentric disposition in this case has no relation with a concentric winding manner as one of manners of winding stator windings.

Figure 6A:
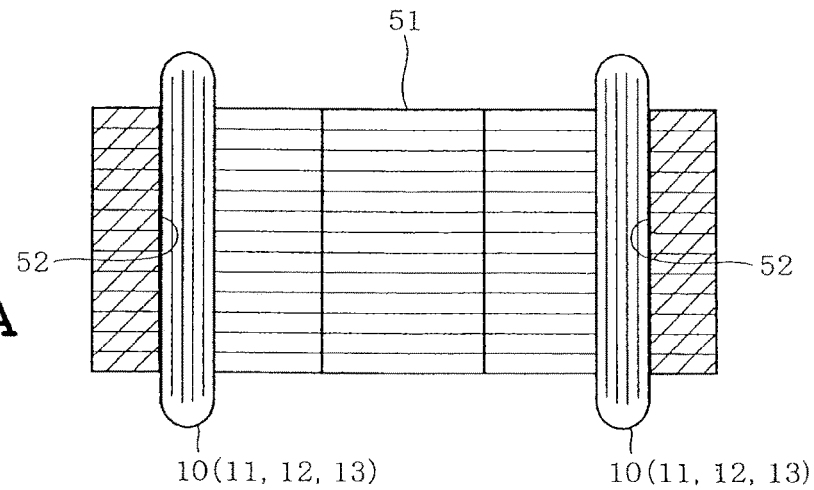
FIGS. 6A, 6B and 6C are sectional views taken along line 6-6 in FIG. 1, showing a step of inserting first and second stage unit coils into the slots (Nos. 1, 2 and 3)
Figure 6B:
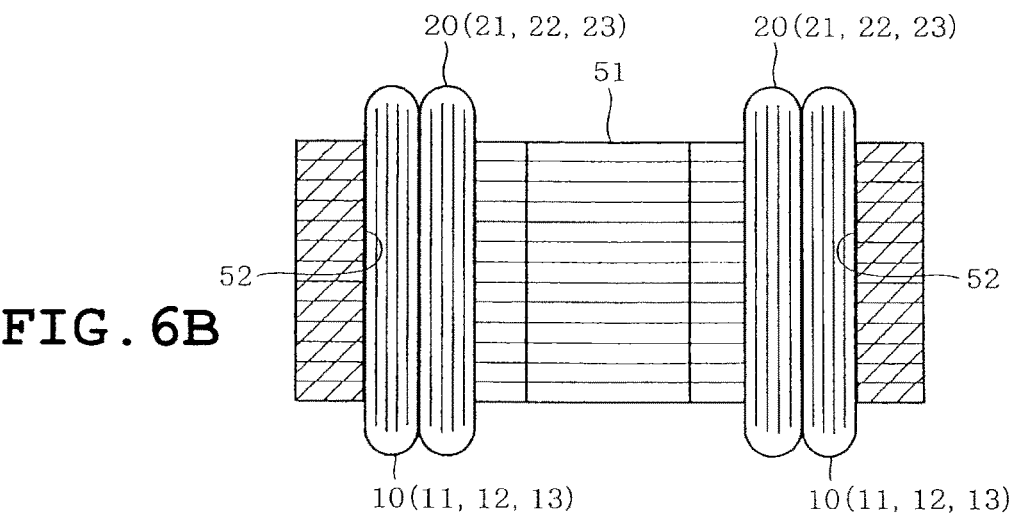
Figure 6C:
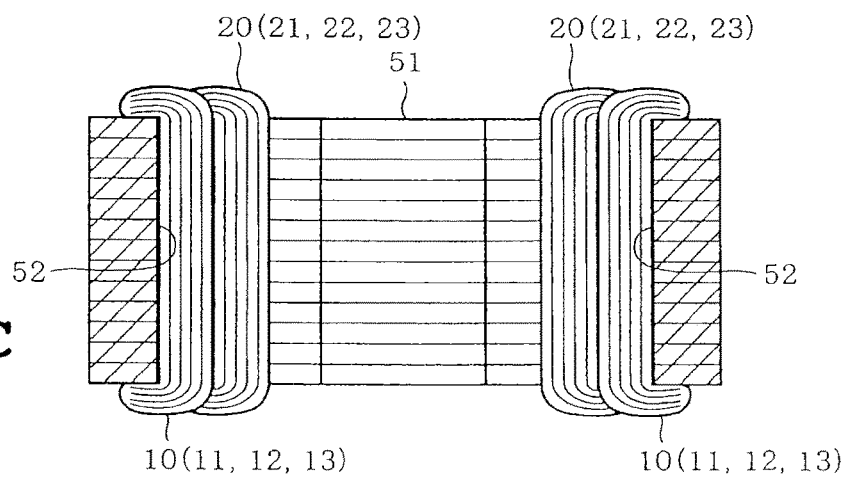

Describing a method of manufacturing the stator 50, the first unit coils 11 to 13 are firstly inserted into the slots 52 of the stator core 51 per phase in the lap winding manner, whereby the coil group located in the back of the slots 52 or the first stage coil group 10 is formed, as shown in FIG. 6A. Subsequently, the second unit coils 21 to 23 are inserted into the slots 52 of the stator core 51 per phase in the lap winding manner, whereby the coil group located at open sides of the slots 52 or the second stage coil group 20 is formed, as shown in FIG. 6B. Subsequently, the coil ends of the first and second coil groups 10 and 20 are spread, whereby the stator 50 is completed, as shown in FIG. 6C.

The stator 50 includes a first interphase insulating paper 53 and second interphase insulating papers 54 as shown in FIG. 1. The first interphase insulating paper 53 is formed by cutting insulating aramid paper into a band shape and connecting both ends of the band-shaped pieces into an annular shape. The first interphase insulating papers 53 are provided between the first and second stage coil groups 10 and 20 at both axial ends of the stator core 51 respectively, with the result that the first and second stage coil groups 10 and 20 are electrically insulated from each other.

Figure 7A:
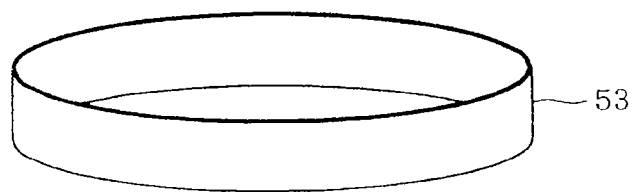
FIGS. 7A and 7B schematically illustrate first and second interphase insulating paper respectively.
Figure 7B:
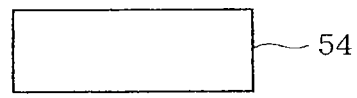

Each second interphase insulating paper 54 is made of a rectangular insulating aramid paper as shown in FIG. 7B. The second interphase insulating papers 54 are provided among the unit coils 11 to 13 of the first stage coil group 10 per phase and among the unit coils 21 to 23 of the second stage coil group 20 per phase, whereby the unit coils of the first and second stage coil groups 10 and 20 are electrically insulated from one another per phase. Note that no interphase insulating paper is contained in the slots 52 since the coils inserted into each slot 52 belong to the same phase.

According to the first embodiment, the poles of the U-, V- and W-phases in the stator windings of the stator 50 are constituted by combining a plurality of, for example two divided unit coils, that is, the first stage unit coils 11 to 13 and the second stage unit coils 21 to 23. This can reduce, or reduce by half in this case, the number of turns of the coils on insertion basis, that is, the unit coils without change in the number of turns of a whole coil constituting one magnetic pole. Accordingly, a sectional area of each one of the unit coils 11, 12, 13, 21, 22 and 23 is reduced with the result that the flexibility of each coil can be increased. Consequently, the operability can be improved in the case where the unit coils 11 to 13 and 21 to 23 are inserted into the slots 52 and accordingly, the insertion of coils into the slots 52 of the stator core 51 can be rendered easier.

Furthermore, the circumferential lengths of the second stage unit coils 21 to 23 disposed in a radially inner part of the stator core 51 are shorter than the circumferential lengths of the first stage unit coils 11 to 13 disposed in a radially outer part of the stator core 51. This can reduce an amount of copper wire used for the second stage unit coils 21 to 23 with the result of reduction in useless copper wire of the coil ends of the second stage unit coils 21 to 23 and copper loss.

Additionally, the height of the coil ends of the second stage unit coils 21 to 23 can be reduced in the foregoing embodiment as compared with the case where the second stage unit coils 21 to 23 have the same circumferential length as the first stage unit coils 11 to 13. This can reduce an axial dimension of the stator 50 and render the stator 50 small in size.

Figure 8:
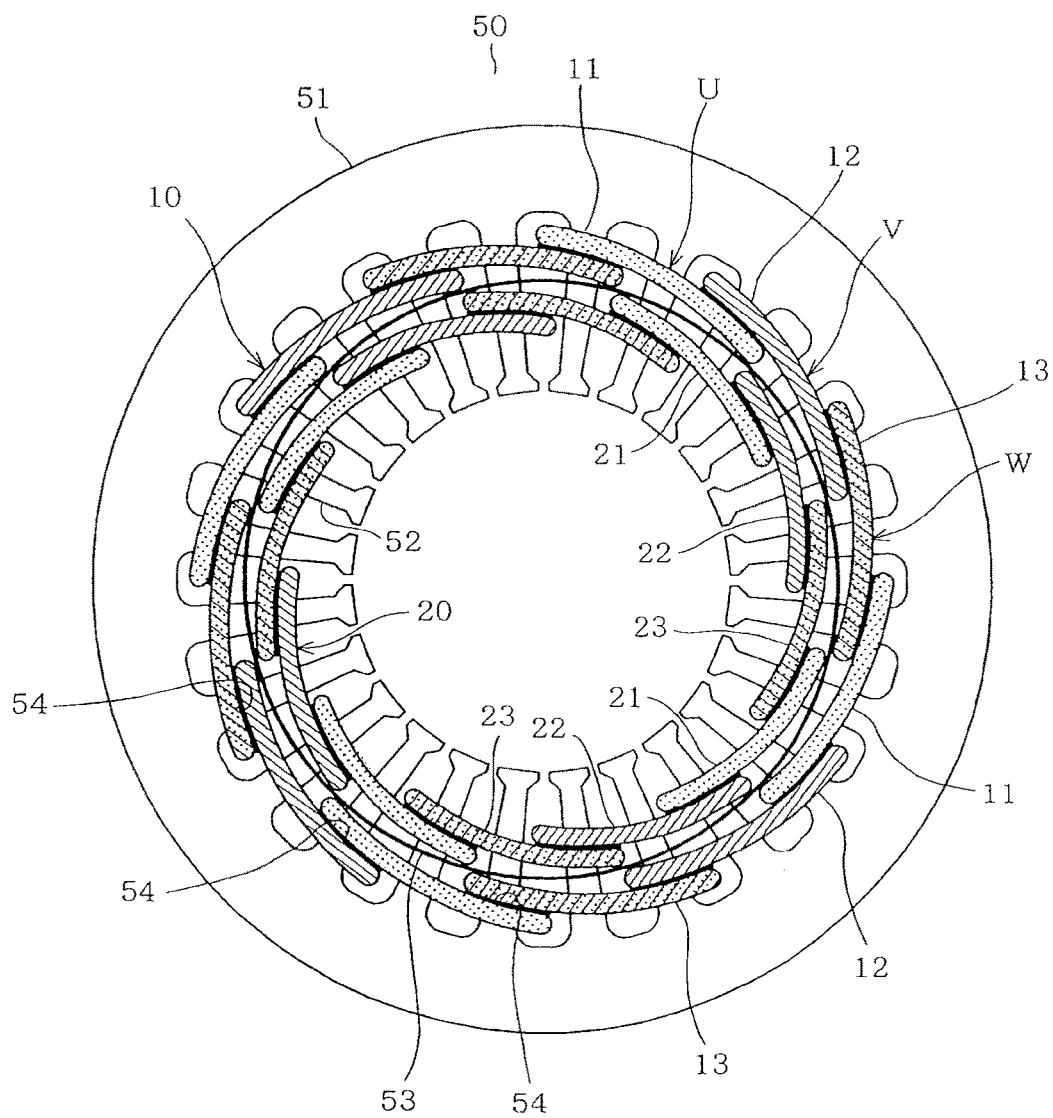
FIG. 8 is a view similar to FIG. 1, showing a second embodiment.
Figure 9A:
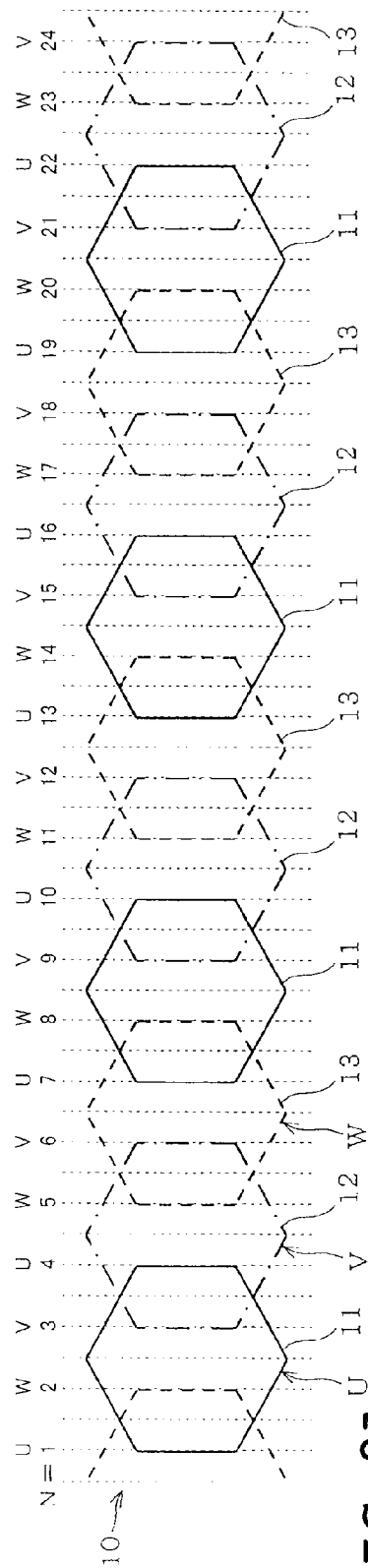
FIGS. 9A and 9B are views similar to FIGS. 2A and 2B, showing a second embodiment, respectively.
Figure 9B:
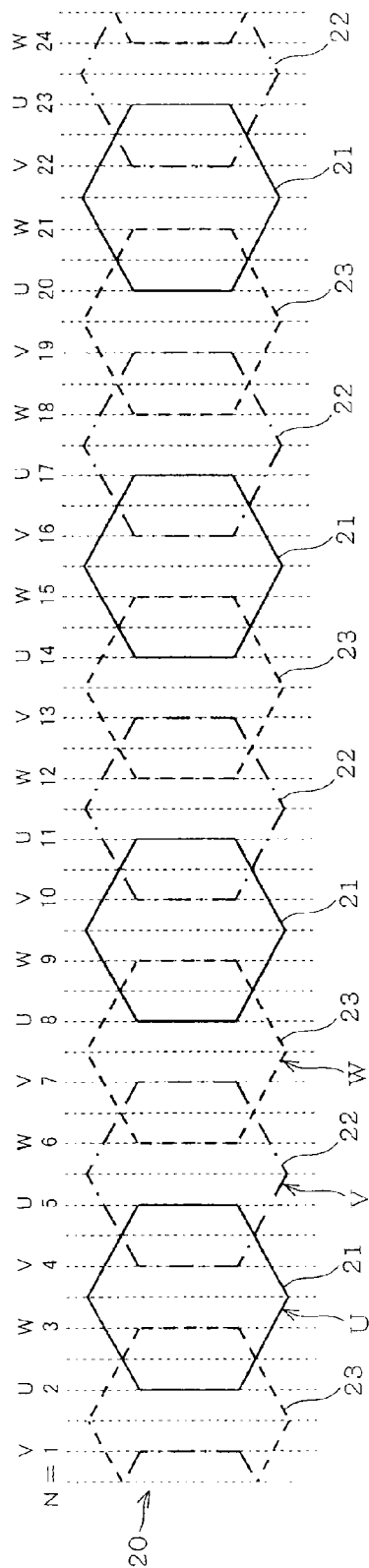

FIGS. 8 to 9B illustrate a second embodiment. The second embodiment is the same as the first embodiment in the shape but differ from the first embodiment in the arrangement. More specifically, the first stage coil groups 10 disposed radially outside the stator core 51 are displaced by one slot from each other. The second stage coil groups 20 disposed radially inside the stator core 51 are also displaced by one slot from each other. In this case, one of the poles in each phase is formed by a plurality of unit coils inserted into different slots 52.

In other words, each U-phase second stage unit coil 21 is inserted into the slot differing from the slot into which the U-phase first stage unit coil 11 belonging to the same phase and same pole as each U-phase second stage unit coil 21 mentioned above and disposed radially outside the stator core 51. Each V-phase second stage unit coil 22 is inserted into the slot differing from the slot into which the V-phase first stage unit coil 12 belonging to the same phase and same pole as each U-phase second stage unit coil 22 mentioned above and disposed radially outside the stator core 51. Each W-phase second stage unit coil 23 is inserted into the slot differing from the slot into which the V-phase first stage unit coil 13 belonging to the same phase and same pole as each V-phase second stage unit coil 23 mentioned above and disposed radially outside the stator core 51.

More specifically, the first stage coil groups 10 in the second embodiment are arranged in the same manner as in the first embodiment, as shown in FIG. 9A. On the other hand, the second stage coil groups 20 in the second embodiment are displaced by one slot relative to the second stage coil groups 20 in the first embodiment, as shown in FIG. 9B. In other words, the U-phase second stage unit coils 21 are inserted into the second and fifth slots, eighth and eleventh slots, fourteenth and seventeenth slots and twentieth and twenty-third slots to be wound on the stator core 51, as shown in FIG. 9B. The V-phase second stage unit coils 22 are inserted into the fourth and seventh slots, tenth and thirteenth slots, sixteenth and nineteenth slots and twenty-second and first slots to be wound on the stator core 51. The W-phase second stage unit coils 23 are inserted into the sixth and ninth slots, twelfth and fifteenth slots, eighteenth and twenty-first slots and twenty-fourth and third slots to be wound on the stator core 51. In this case, two unit coils belonging to different phases are inserted into each one of the slots 52. Accordingly, an interphase insulating paper (not shown) is provided between the unit coils of different phases in each slot 52 so that the unit coils of different phases are electrically insulated from each other.

According to the above-described configuration, the second embodiment can achieve the same advantageous effect as the first embodiment. Furthermore, the second embodiment can achieve the same advantageous effect as the structure in which a rotor (not shown) is skewed. More specifically, for example, a squirrel cage three-phase induction motor generally includes a squirrel-cage stator further including two end rings provided on both axial ends of a rotor and a plurality of bars connecting the end rings. In order that torque nonuniformity may be suppressed, the squirrel-cage rotor is formed into a skewed structure in which the end rings and the bars are angled without being vertically disposed. The rotor is diecast from aluminum, for example. In this case, when the rotor is to be skewed, the motor is difficult to manufacture. According to the structure of the second embodiment, however, the first and second stage coil groups 10 and 20 are disposed so as to be displaced circumferentially with respect to the stator core 51. This can achieve the same advantageous effect as the case where the stator is skewed. Consequently, the stator need mot be skewed with the result that the structure of the rotor can be simplified.

Figure 10A:
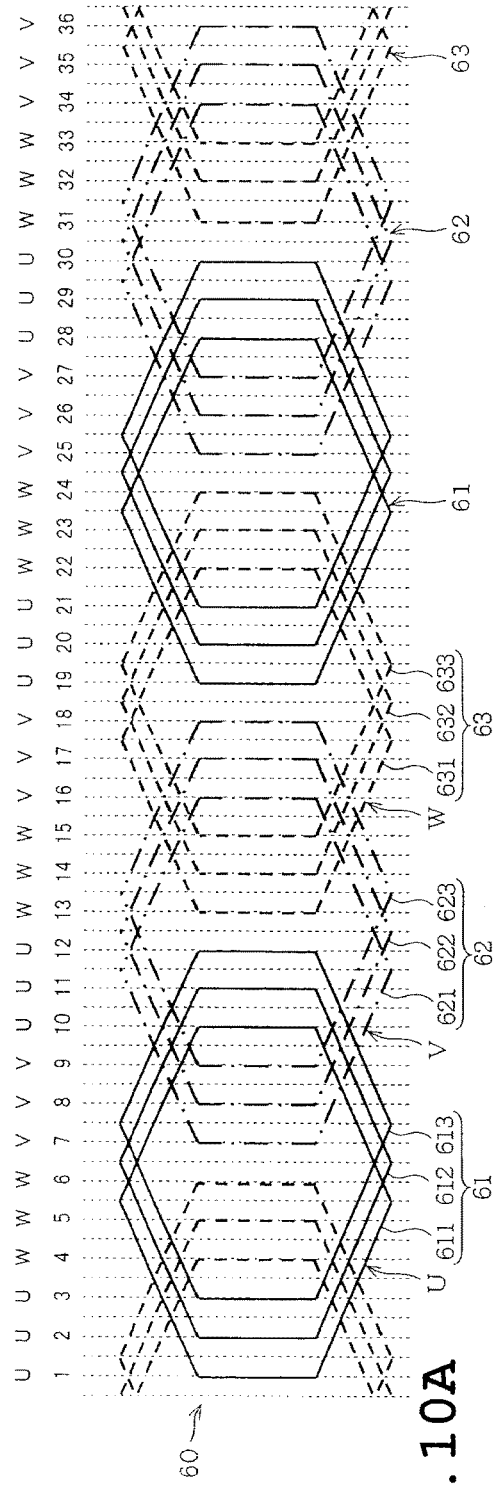
FIGS. 10A and 10B are views similar to FIGS. 2A and 2B, showing a third embodiment, respectively.
Figure 10B:
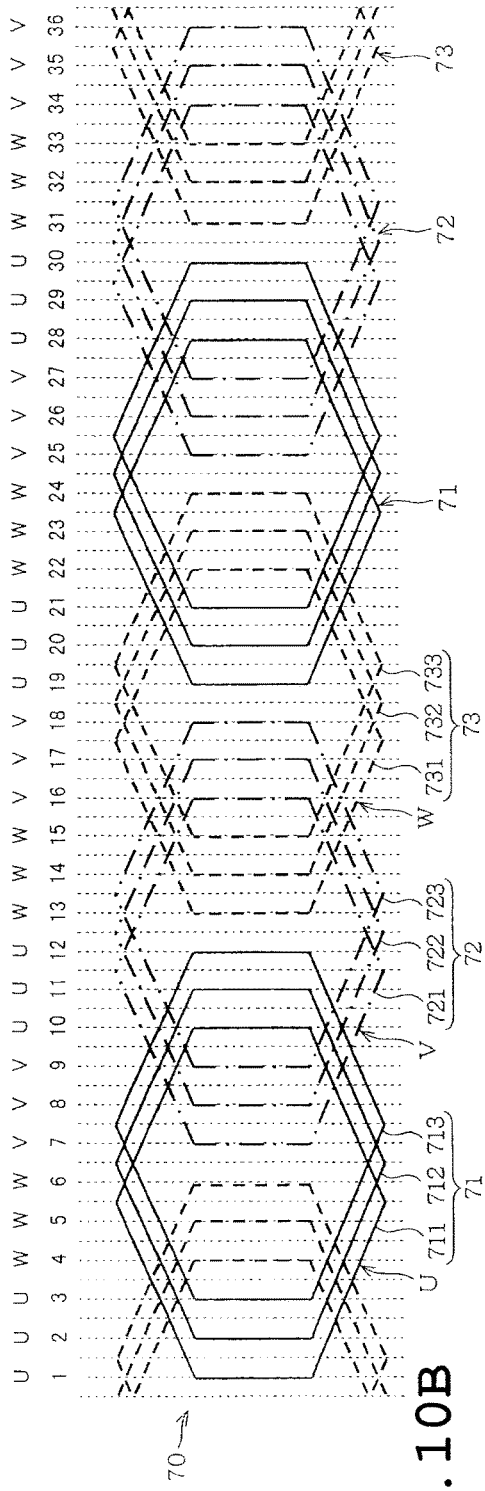

FIGS. 10A and 10B illustrate a third embodiment. FIGS. 10A and 10B show arrangement of unit coils employed in a four-pole thirty-six slot stator 50. In the third embodiment, the stator 50 includes a first stage coil group 60 and a second stage coil group 70. The first stage coil group 60 is constructed into a structure as obtained by further dividing the first stage unit coils 11 to 13 in the first embodiment into three parts. More specifically, the first stage coil group 60 in the third embodiment includes two pairs of U-phase first stage unit coil groups 61, V-phase first stage unit coil groups 62 and W-phase first stage unit coil groups 63.

Each U-phase first stage unit coil group 61 includes three unit coils 611, 612 and 613 arranged at a pitch of nine slots so as to be displaced by one slot, for example. In the same manner, each V-phase first stage unit coil group 62 includes three unit coils 621, 622 and 623 arranged at a pitch of nine slots so as to be displaced by one slot. Each W-phase first stage unit coil group 63 also includes three unit coils 611, 612 and 613 arranged at a pitch of nine slots so as to be displaced by one slot.

Each U-phase second stage unit coil group 61 includes three unit coils 611, 612 and 613 arranged at a pitch of nine slots so as to be displaced by one slot, for example. In the same manner, each V-phase first stage unit coil group 62 includes three unit coils 621, 622 and 623 arranged at a pitch of nine slots so as to be displaced by one slot.

The second stage coil group 70 is also constructed into a structure as obtained by further dividing the second stage unit coils 21 to 23 in the first embodiment into three parts in the same manner as the first stage coil group 60. More specifically, the second stage coil group 70 in the third embodiment includes two pairs of U-phase second stage unit coil groups 71, V-phase second stage unit coil groups 72 and W-phase second stage unit coil groups 73.

Each U-phase second stage unit coil group 71 includes three unit coils 711, 712 and 713 arranged at a pitch of nine slots so as to be displaced by one slot, for example. In the same manner, each V-phase second stage unit coil group 72 includes three unit coils 721, 722 and 723 arranged at a pitch of nine slots so as to be displaced by one slot. Each W-phase second stage unit coil group 73 also includes three unit coils 731, 732 and 733 arranged at a pitch of nine slots so as to be displaced by one slot.

In this case, each one of the unit coils 611 to 613, 621 to 623 and 631 to 633 constituting each first stage coil group 60 has the same number of turns as each one of the unit coils 711 to 713, 721 to 723 and 731 to 733 constituting each second stage coil group 70. On the other hand, each one of the unit coils 711 to 713, 721 to 723 and 731 to 733 constituting each second stage coil group 70 has a shorter circumferential length than each one of the unit coils 611 to 613, 621 to 623 and 631 to 633 constituting each first stage coil group 60.

In this case, stator windings U, V and W of the U-, V- and W-phases are formed by a single-layer lap winding method. In the single-layer lap winding method, the unit coils belonging to different phases are not inserted into the same slot in the lap winding method, that is, the unit coils belong to one phase are inserted into each slot.

Furthermore, the total number of turns of the U-phase first and second stage unit coil groups 61 and 71 is 40 in the same manner as in the first embodiment. The total number of turns of the V-phase first and second stage unit coil groups 62 and 72 is also 40 in the same manner as in the first embodiment. The total number of turns of the W-phase first and second stage unit coil groups 63 and 73 is also 40 in the same manner as in the first embodiment.

According to the above-described winding arrangement, the third embodiment can achieve the same advantageous effects as the first and second embodiments. Furthermore, since the number of turns of each unit coil inserted into each slot 52 on insertion basis can be further reduced, each unit coil has more flexibility and can be inserted into each slot 52 further easily.

The stator windings U, V and W of the U-, V- and W-phases are formed by the single-layer lap winding method. More specifically, the unit coils belonging to different phases are not inserted into the same slot. This necessitates no consideration about electrical insulation between the unit coils of different phases in each slot 52, and no interphase insulating paper is required in each slot 52. Accordingly, the construction of the stator 50 can be further simplified. Furthermore, since a larger space is ensured in each slot 52, the unit coils can be inserted into the slots 52 further easily.

The stator 50 should not be limited to the construction described in each foregoing embodiment. The number of the slots 52 and the number of poles may be changed. Thus, the stator 50 should not be limited to the four-pole twenty-four-slot structure and the four-pole thirty-six slot structure. For example, the stator 50 may be formed into a four-pole forty-eight slot structure. Furthermore, coils constituting one magnetic pole may be divided into three or more groups to be arranged in the sequence of a first stage coil group, second stage coil group and third stage coil group.

According to the foregoing embodiments, the stator of a rotating electrical machine includes a plurality of coil groups formed by inserting a plurality of unit coils into slots of the stator core by the lap winding method. The coil groups include those located at the outer circumference side of the stator core. The unit coils constituting these coil groups located at the outer circumference side of the stator core have respective shorter circumferential lengths than the unit coils constituting the coil groups located at the inner circumference side of the stator core. This can reduce waste of copper wire forming the unit coils, copper loss of the coils and the heights of the coil ends. Furthermore, the number of turns of each unit coil which is a unit of insertion is reduced without change in the total number of turns of the coils constituting one pole. This reduces the sectional area of each unit coil and increases the flexibility of each unit coil. Accordingly, the operability can be improved in the case where the unit coils are inserted into the slots of the stator core and accordingly, the insertion of coils into the slots of the stator core can be rendered easier.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A rotating electrical machine comprising:
a stator having a stator core and a plurality of groups of coils, the plurality of coil groups including a first coil group located at an outer circumference side of the stator core and a second coil group located at an inner circumference side of the stator core, the first and second coil groups being respectively formed into an annular shape formed by inserting a plurality of unit coils into slots of the stator core so that for each of the first and second coil groups, each coil of a coil group overlaps adjacent coils corresponding to one or more different phases than the each coil, the adjacent coils including a coil adjacent in a circumferential direction of the stator core and a coil adjacent in an opposite direction to the circumferential direction, and in a radial direction, each coil overlaps inside one of the adjacent coils and outside another of the adjacent coils; and
a rotor rotatably mounted on the stator, wherein:
all of the unit coils constituting the second coil group are disposed inside the unit coils constituting the first coil group so that, in the radial direction, a closed perimeter inside the first coil group is interposed between the first coil group and the second coil group and the closed perimeter is disposed to surround and enclose an outside of the second coil group;
the first and second coil groups are disposed in a concentric manner; and
the unit coils constituting the second coil group have shorter circumferential lengths than the unit coils constituting the first coil group.

2. The machine according to claim 1, wherein the coil groups are arranged concentrically.

3. The machine according to claim 1, wherein a height of a coil end of the unit coils of the first coil group located at the outer circumference side of the stator core is equal to a height of a coil end of the unit coils constituting the second coil group located at the inner circumference side of the stator core.

4. The machine according to claim 1, wherein the unit coils of same phase are inserted into the same slots.

5. The machine according to claim 4, wherein the coil groups are arranged concentrically.

6. The machine according to claim 1, wherein each coil group includes the unit coils of same phase, inserted into the slots displaced from each other by a predetermined number of slots.

7. The machine according to claim 6, wherein the coil groups are arranged concentrically.

8. The machine according to claim 6, wherein one of the unit coils is contained in one of the slots.

9. The machine according to claim 8, wherein the coil groups are arranged concentrically.

10. A method of manufacturing a rotating electrical machine which includes a stator core and a plurality of coil groups the plurality of coil groups including a first coil group located at an outer circumference side of the stator core and a second coil group located at an inner circumference side of the stator core, the unit coils constituting the second coil group having shorter circumferential lengths than the unit coils constituting the first coil group, the method comprising:
inserting the unit coils constituting the coil group located in back of slots of the stator core in the first and second coil groups, into the slots so that circumferentially adjacent coils overlap radially alternately and so that each coil has one side located radially outside one adjacent coil and the other side located radially inside another adjacent coil, thereby disposing the unit coils in an annular shape, so that for each of the first and second coil groups, each coil of a coil group overlaps adjacent coils corresponding to one or more different phases than the each coil, the adjacent coils including a coil adjacent in a circumferential direction of the stator core and a coil adjacent in an opposite direction to the circumferential direction, and, in a radial direction, each coil overlaps inside one of the adjacent coils and outside another of the adjacent coils; and
thereafter inserting the unit coils constituting the coil group located at open sides of the slots of the stator core in the first and second coil groups, into the slots so that all of the unit coils constituting the second coil group are disposed inside of a perimeter on an inside of the unit coils constituting the first coil group, the perimeter being interposed, in the radial direction, between the first coil group and the second coil group to surround and enclose an outside of the second coil group and the coils adjacent in a circumferential direction of the stator core overlap alternately in a radial direction of the stator core so that circumferentially adjacent coils overlap radially alternately.

11. The method according to claim 10, wherein a height of a coil end of the unit coils of the first coil group located at the outer circumference side of the stator core is equal to a height of a coil end of the unit coils constituting the second coil group located at the inner circumference side of the stator core.

* * * * *